United States Patent [19]
Olsson et al.

[11] Patent Number: 5,915,222
[45] Date of Patent: Jun. 22, 1999

[54] TRANSPORTING SHORT MESSAGE SERVICE (SMS) MESSAGES WITHIN A TELECOMMUNICATIONS NETWORK

[75] Inventors: Johan Kristofer Olsson, Stockholm; Patrik Torgny Karlsson, Bromma, both of Sweden; Keijo Tapio Laiho, Espoo, Finland

[73] Assignee: Telefonaktiebolaget L M Ericsson (publ), Sweden

[21] Appl. No.: 08/771,711

[22] Filed: Dec. 20, 1996

[51] Int. Cl.⁶ .................................................. H04M 7/20
[52] U.S. Cl. ............................................ 455/466; 455/445
[58] Field of Search .................................. 455/466, 433, 455/422, 432, 458, 31.1–31.2, 445; 329/207, 229, 230; 370/259, 389, 252

[56] References Cited

U.S. PATENT DOCUMENTS

| | | | |
|---|---|---|---|
| 5,329,578 | 7/1994 | Brennan et al. | 379/88.19 |
| 5,469,496 | 11/1995 | Emery et al. | 455/461 |
| 5,504,804 | 4/1996 | Widmark et al. | 455/414 |
| 5,577,102 | 11/1996 | Koivunen | 455/433 |
| 5,592,535 | 1/1997 | Klotz | 455/406 |
| 5,699,053 | 12/1997 | Jonsson | 340/825.44 |
| 5,742,905 | 4/1998 | Pepe et al. | 455/461 |
| 5,768,509 | 6/1998 | Gunluk | 395/200.33 |

FOREIGN PATENT DOCUMENTS

| | | |
|---|---|---|
| 44 42 307 C1 | 11/1994 | European Pat. Off. . |
| 0 714 214 A2 | 5/1996 | European Pat. Off. . |
| 0 717 570 A2 | 6/1996 | European Pat. Off. . |
| WO 94/05126 | 3/1994 | WIPO . |
| WO 96/13949 | 5/1996 | WIPO . |
| WO 96/20572 | 7/1996 | WIPO . |

OTHER PUBLICATIONS

*Global System for Mobile Communications—What's In Store?* by K.A. Holley, BT Technol J vol. 4, No. 3, Jul. 1996.

*Primary Examiner*—Reinhard J. Eisenzopf
*Assistant Examiner*—Charles N. Appiah
*Attorney, Agent, or Firm*—Jenkens & Gilchrist, P.C.

[57] ABSTRACT

A Short Message Service (SMS) communication network is interfaced with an Intelligent Network. In response to an indication from a mobile subscriber to transmit unstructured data towards a particular B-number, a serving mobile switching center/visitor location register (MSC/VLR) determines whether the calling party subscriber or called party subscriber is associated with an IN service. In response to an affirmative determination, instead of transmitting the received unstructured data directly to a Short Message Service-Center (SMS-C), the serving MSC/VLR routes an Integrated Service Digital Network User Part (ISUP) signal encapsulating the unstructured data to the associated Intelligent Network. An associated Service Switching Point (SCP) and Service Control Point (SSP) then provide the desired IN service to the received unstructured data.

17 Claims, 5 Drawing Sheets

TRANSPORTING SHORT MESSAGE SERVICE (SMS) MESSAGES WITHIN A TELECOMMUNICATIONS NETWORK

BACKGROUND OF THE INVENTION

1. Technical Field of the Invention

The present invention relates to a mobile telecommunications network and, in particular, to the transmission of short message service (SMS) messages using Intelligent Network (IN) services.

2. Description of Related Art

With the continuing developments of telecommunications technology, the concepts of an intelligent network (IN) and associated services have been developed to provide intelligent and advanced telecommunications services to subscribers. The basic concept behind IN is to move the "intelligence" out of each local exchange or Service Switching Point (SSP) and to centralize the services providing the intelligence in a Service Control Point (SCP). By centralizing the special subscriber services in an SCP, a new service can be added in only one place (the SCP) and provided to all subscribers connected to the multiple SSPs which are connected to the SCP. Consequently, a large number of subscribers connected by way of multiple SSPs are serviced by a single SCP.

Initially, IN was a concept implemented only within a Public Switched Telephone Network (PSTN) servicing wireline telecommunications subscribers. Accordingly, SSPs or local exchanges (LEs) communicated connection-less Signaling Control Connection Part (SCCP) based signals with an associated SCP to provide services to associated wireline subscribers. With the introduction of digital mobile telecommunications networks, such as a Global System For Mobile (GSM) based Public Land Mobile Network (PLMN), the IN technology is also being implemented in a wireless telecommunications environment. Accordingly, a mobile switching center (MSC) within a PLMN communicates with an associated Intelligent Network to provide IN services to associated mobile subscribers.

One IN service comprises a Private Number Plan (PNP) feature. A number of mobile subscribers are associated with each other, and each of the associated mobile subscribers is then identified by a short number (or more commonly known as extension numbers). As a result, those associated mobile stations function similar to Private Branch Exchange (PBX) subscribers, and one mobile subscriber may establish a call connection with another associated mobile subscriber by merely dialing the associated short number. Other such IN services include Originating Call Barring, Closed User Groups, Restriction Override, and Call Diversion.

With the introduction of GSM digital based telecommunications systems, a number of advanced non-speech services are further provided to mobile subscribers. One such service comprises a Short Message Service (SMS). Using an SMS message, a mobile subscriber is able to communicate text messages with another mobile station or SMS terminals without establishing a call connection therebetween. A first mobile subscriber simply types the desired text message, indicates the directory number associated with the destination mobile subscriber, and transmits the SMS message encapsulating the desired text message.

However, one deficiency or inefficiency with the existing system is that the serving telecommunications network utilizes a first network to provide IN services and a second network to communicate SMS messages. As a result, even if a mobile subscriber has the PNP feature, the mobile subscriber is not currently able to transmit an SMS message to another associated mobile subscriber utilizing the associated short number. As a further illustration, even if the mobile subscriber has the Originating Call Barring feature to bar an outgoing call connection towards a particular destination number, the mobile telecommunications network is not able to bar an outgoing SMS message toward the same number. This is because, currently, a mobile telecommunications network for routing SMS messages does not interface with an associated IN.

Accordingly, there is a need for a mechanism to enable SMS messages to access existing IN services within a mobile telecommunications network.

SUMMARY OF THE INVENTION

The present invention discloses a method and apparatus for utilizing IN services associated with either a calling party subscriber or a called party subscriber to communicate unstructured data therebetween within a mobile telecommunications network.

An indication to transmit unstructured data, such as Short Message Service data, is received at a mobile switching center (MSC) serving a particular mobile subscriber. A determination is then made as to whether the calling party subscriber or dialed B-number is associated with an IN service. In response to an affirmative determination, instead of transmitting the SMS data to an associated Short Message Service-Center (SMS-C) directly, a next determination is made to ascertain the identity of a Service Switching Point (SSP) associated with the determined IN service. The received SMS data are then forwarded to the determined SSP for IN service utilization. The SMS data are encapsulated within an Integrated Service Digital Network User Part (ISUP) signal and transmitted to the connected SSP. By requesting routing instructions from an associated Service Control Point (SCP), the SSP thereafter provides the appropriate IN service to the received SMS data.

BRIEF DESCRIPTION OF THE DRAWINGS

A more complete understanding of the method and apparatus of the present invention may be had by reference to the following detailed description when taken in conjunction with the accompanying drawings wherein.

DETAILED DESCRIPTION OF THE DRAWINGS

Figure 1:
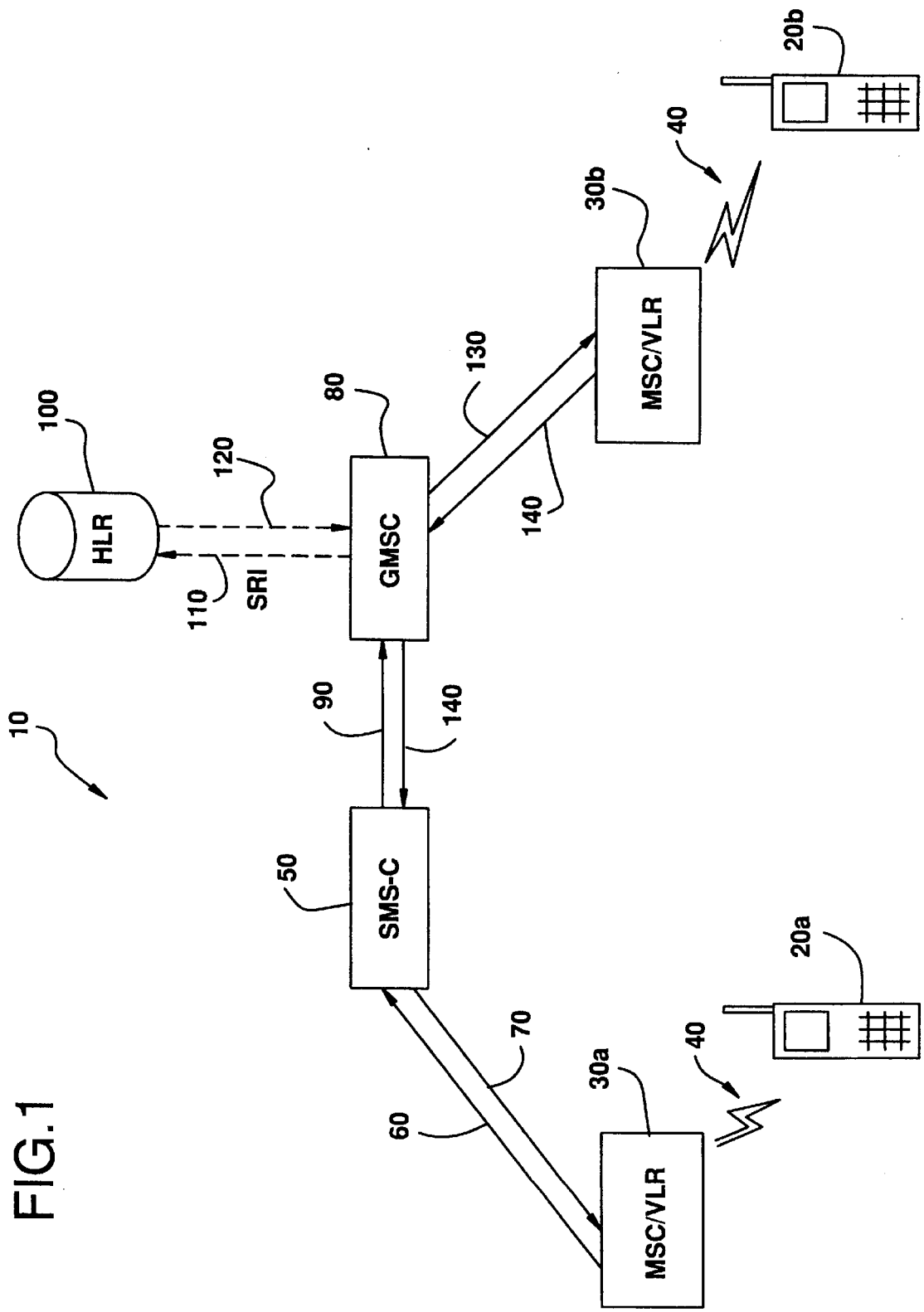
FIG. 1 is a block diagram of a first telecommunications network illustrating the routing of a Short Message Service (SMS) message between mobile stations.

FIG. 1 is a block diagram of a first telecommunications network 10 illustrating the routing of a Short Message Service (SMS) message between two mobile stations. A first mobile station 20a transmits unstructured data, such as an SMS message, towards a first mobile switching center/visitor location register (MSC/VLR) 30a currently serving the first mobile station 20a. The transmitted SMS message includes a destination B-number and is transported over a control channel 40, such as a Stand-alone Dedicated Control Channel (SDCCH), to the serving MSC/VLR 30a. The serving MSC/VLR 30a then analyzes the received B-number and accordingly reroutes the received SMS data towards a Short Message Service-Center (SMS-C) 50 (signal 60). The signal 60 comprises the received SMS data encapsulated within an Integrated Service Digital Network User Part (ISUP) based signal, such as an Initial Address Message (IAM), and transported over a connected Signaling System No. 7 (SS7) telecommunications network to the SMS-C 50. The SMS-C 50 then acknowledges the receipt of the SMS data by returning an acknowledgment signal 70 to the serving MSC/VLR 30a.

Figure 2:
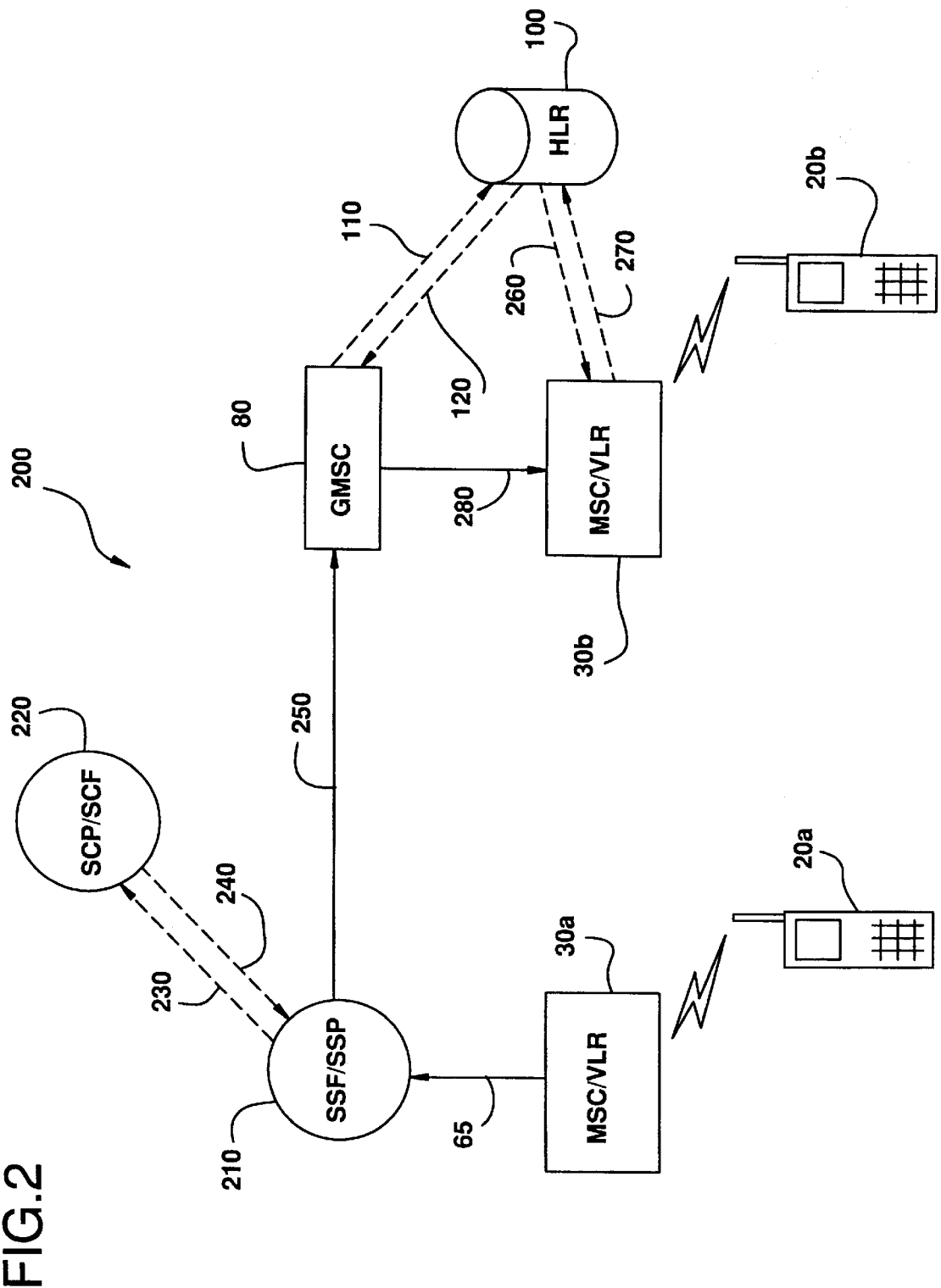
FIG. 2 is a block diagram of a second telecommunications network illustrating the provision of Intelligent Network (IN) services to mobile subscribers.

The SMS-C 50 then forwards the received SMS data towards an Gateway Mobile Switching Center (GMSC) 80 associated with the indicated B-number (signal 90). The GMSC 80 may be a separate telecommunications node for handling only SMS messages (also known as SMS-GMSC), or it may be a conventional GMSC for handling SMS messages as well as incoming call connections. The GMSC 80 may also be equipped with Interworking Functions (IWF) for handling non-voice data transmission. Since the called party mobile station is not associated with a fixed local exchange, the GMSC 80 then needs to interrogate a home location register (HLR) 100 associated with the called party mobile station to ascertain the mobile station's current location. Accordingly, a Mobile Application Part (MAP) based signal 110, such as a Send Routing Instruction (SRI) signal, is transmitted from the GMSC 80 to the associated HLR 100. The HLR 100, in turn, may communicate with a second MSC/VLR 30b currently serving the called party mobile station 20b and requests a roaming number (signaling not shown in FIG. 1, but is shown in FIG. 2). The received roaming number representing the called party mobile station 20b currently traveling within the second MSC/VLR service area is then forwarded back to the GMSC 80 via another MAP based signal 120.

Utilizing the received roaming number, the GMSC 80 reroutes the received SMS data towards the second MSC/VLR 30b currently serving the called party mobile station 20b (signal 130). The second MSC/VLR 30b then communicates the delivered SMS data over a SDCCH channel 40 to the called party mobile station 20b. An acknowledgment signal 140 indicating that the data have been delivered successfully is then returned back to the GMSC 80. The GMSC 80, in turn, forwards the acknowledgment signal 140 to the SMS-C 50. As a result, unstructured data, such as user defined text messages, have been communicated between the first mobile station 20 and the second mobile station 20b without establishing a circuit connection over the associated telecommunications network.

As the system and method of the present invention are applicable to any unstructured data communicated within a telecommunications network, it will be understood that the description of the present invention in the context of SMS messages provided herein is by way of explanation of the invention rather than of limitation of the scope of the invention. Other unstructured data, such as Unstructured Supplementary Service Data (USSD) messages, are equally applicable for the present invention.

FIG. 2 is a block diagram of a second telecommunications network 200 illustrating the provision of Intelligent Network (IN) services to mobile subscribers. As an illustration, the first mobile station 20a is associated with the Private Number Plan (PNP) feature. The first mobile station 20a dials a short number (similar to a PBX extension) associated with the second mobile station 20b and requests a call connection therebetween. The request for a call connection is first received by the first MSC/VLR 30a serving the first mobile station 20a. Upon determining that the first mobile station is associated with an IN service, the first MSC/VLR 30a transmits a ISUP based signal 65, such as an IAM, to the associated Service Switching Point (SSP, also known as a Service Switching Function and hereinafter collectively referred to as an SSF/SSP) 210. The SSF/SSP 210 then queries the associated Service Control Point (SCP, also known as a Service Control Function and hereinafter collectively referred to as an SCP/SCF) 220. Accordingly, a Signaling Control Connection Part (SCCP) based signal 230, such as a Transaction Capability Application Part (TCAP) or Advanced Intelligent Network (AIN) based signal, is transmitted from the SSF/SSP 210 to the SCP/SCF 220. The SCP/SCF 220 then determines the appropriate IN service associated with the dialed B-number, and transforms the dialed short number into a routeable E.164 formatted directory number. The routeable directory number is then transmitted back to the requesting SSF/SSP 210 via yet another SCCP based signal 240. Utilizing the received directory number, the call setup signal is then forwarded to the GMSC 80 associated with the received full directory number (signal 250). In a similar manner as described above in FIG. 1, the GMSC 80 then transmits a MAP based signal 110, such as the SRI, to the associated HLR 100. The SRI signal 110 interrogates the HLR 100 and requests a roaming number representing the mobile station 20b therefrom. The HLR 100, in turn, may transmit another MAP based signal 260 to the second MSC/VLR 30b currently serving the called party mobile station 20b. The MAP based signal 260, such as a Provide Roaming Number (PRN) signal, requests the second MSC/VLR 30b to provide a roaming number representing the second mobile station 20b currently traveling within its coverage area. In response, the second MSC/VLR 20b provides the roaming number back to the HLR 100 via yet another MAP based signal 270. The HLR 100, in turn, forwards the received roaming number back to the GMSC 80 via the MAP based signal 120.

Utilizing the received roaming number, the GMSC 80 forwards the received incoming call connection to the second MSC/VLR 30b. As a result, another circuit call connection 280 is established between the GMSC 80 and the second MSC/VLR 30b. The called party mobile station is then paged by the second MSC/VLR 20b, and a radio connection is established therebetween to enable the first mobile station 20a to communicate with the called party mobile station 20b.

As is illustrated above, the first telecommunications network for routing unstructured data is different and separate from the second telecommunications network utilized for establishing a call connection between mobile stations. Accordingly, IN services associated with a particular mobile station and provided by an SCP/SCF are currently unavailable to unstructured data. As a result, the convenience and "intelligence" provided by such IN services are lacking within the Short Message Service or other unstructured data services.

Figure 3:
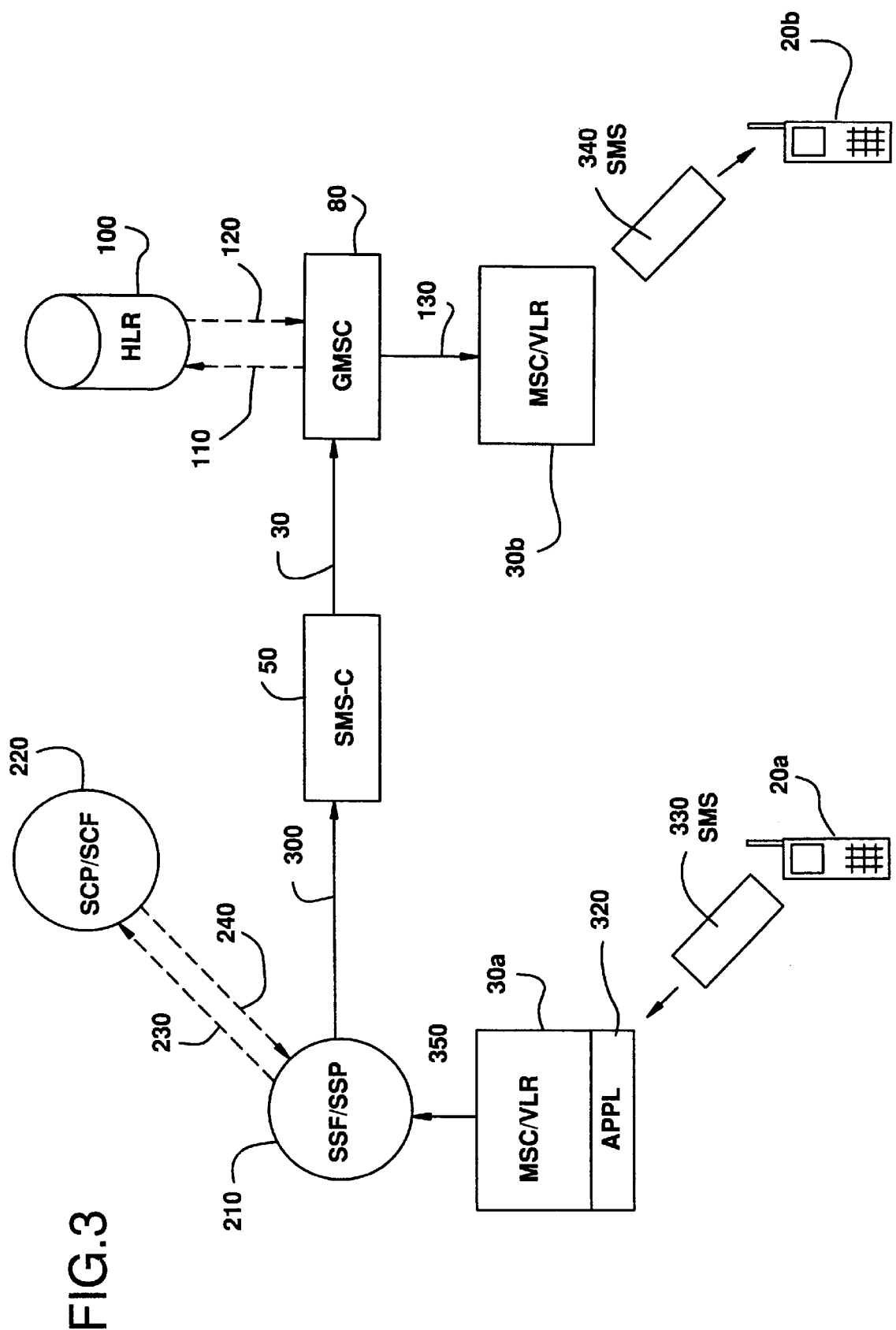
FIG. 3 is a block diagram of the first telecommunications network interfacing with the second telecommunications network for providing IN services to a mobile station originating an SMS message.
Figure 4:
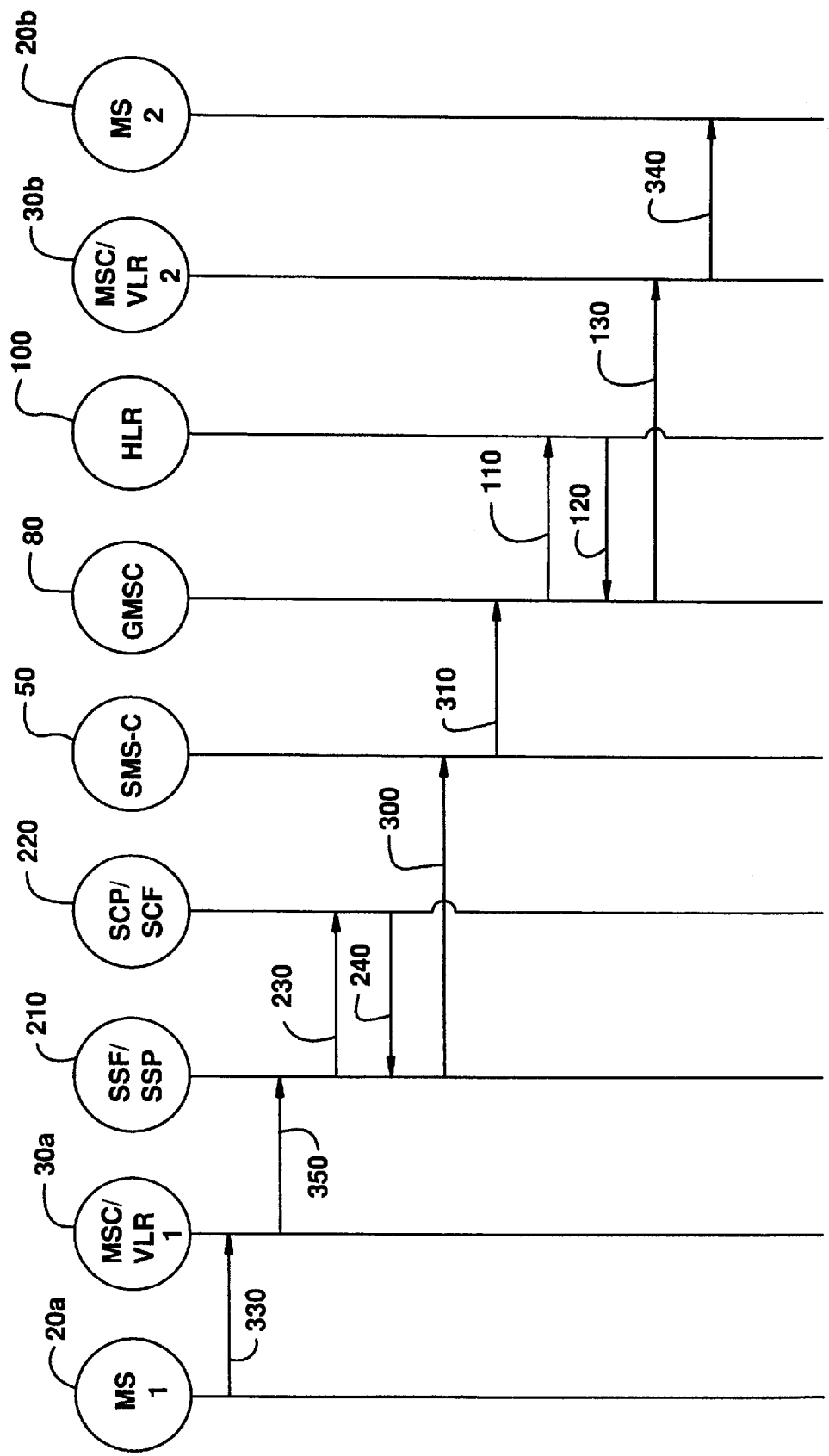
FIG. 4 is a signal sequence chart illustrating the provision of IN services to a mobile station originating an SMS message within a mobile telecommunications network.

Reference is now made to FIGS. 3 and 4 illustrating the first telecommunications network interfacing with the second telecommunications network for providing IN services to the first mobile station 20a originating an SMS message in accordance with the teachings of the present invention. The first mobile station 20a transmits an SMS message 330 towards the serving first MSC/VLR 30a. An application module 320 associated with the first MSC/VLR 30a then determines whether an IN service needs to be invoked for the received SMS message. There are basically two ways to make such a determination. The first determination is to ascertain whether the first mobile station 20a originating the SMS message is associated with an applicable IN service. The second determination is to ascertain whether the second mobile station 20b receiving the SMS message is associated with an applicable IN service. For example, the first mobile station 20a may be associated with PNP and the number dialed by the first mobile station is a short number (or extension number) representing the associated second mobile station 20b. As a further illustration, the second mobile station 20b may be associated with a free-phone IN service whereby all incoming call connections towards the second mobile station 20b are charged to the second mobile station's subscription. The application module 320 need not determine which particular IN service needs to be invoked. The application module 320 only needs to ascertain whether any IN service is associated with either the calling party subscriber or called party subscriber.

In response to an affirmative determination, the first MSC/VLR 30a then forwards the received SMS message to the SSF/SSP 210 associated with the determined subscriber (signal 350). One way of forwarding such SMS message is to encapsulate the received SMS message within an ISUP signal and specifying the ISUP signal as user-to-user transmission within the connected Signaling System No. 7 (SS7) telecommunications network. Upon receiving the transmitted ISUP signal, the SSF/SSP 210 then transmits a SCCP based signal 230 to query the associated SCP/SCF 220. As fully described above, the SCP/SCF 220 is the centralized data base containing subscriber and feature information to providing the necessary IN service to its associated subscribers. As a result, the SCP/SCF 220 determines the appropriate call treatment to be applied towards the received SMS message. As an illustration, for the PNP feature, the SCP/SCF 220 transforms the dialed short number into a routeable full directory number, such as a Mobile Station Integrated Service Digital Network (MSISDN) number, representing the second mobile station 20b. The transformed directory number is then provided back to the SSF/SSP via another SCCP based signal 240. Utilizing the provided directory number, the SSF/SSP 210 then routes the received SMS data over the connected SS7 telecommunications network to the associated SMS-C 50. This could be accomplished by merely replacing the destination address within the received ISUP signal, such as an IAM, to represent the provided full directory number.

In a conventional manner, the SMS-C then forwards the received ISUP signal encapsulating the SMS data to the associated GMSC 80. The GMSC 80 then similarly interrogates the HLR 100 associated with the received directory number to ascertain the current location of the called party mobile station 20b (signal 110). The HLR 100 may then transmit another MAP based signal requesting a roaming number from the second MSC/VLR 20b currently serving the called party mobile station 20b (signaling not shown in FIG. 3, but shown in FIG. 2). After receiving the roaming number from the second MSC/VLR 30b, the HLR 100 further forwards the received roaming number to the GMSC 80 via yet another MAP based signal 120. Utilizing the received roaming number representing the called party mobile station currently traveling within the second MSC/ VLR coverage area, the GMSC 80 is able to route the received ISUP signal containing the SMS data to the second MSC/VLR 30b (signal 130). The second MSC/VLR 30b then transmits the received SMS data over a SDCCH channel to the called party mobile station 20b.

As illustrated, the first mobile station 20a is able to effectuate the communication of non-speech data while still utilizing its associated IN services. As a result, separate speech connection networking and unstructured data communication networking are integrated into a single network, and unstructured data are able to access IN services.

Figure 5:
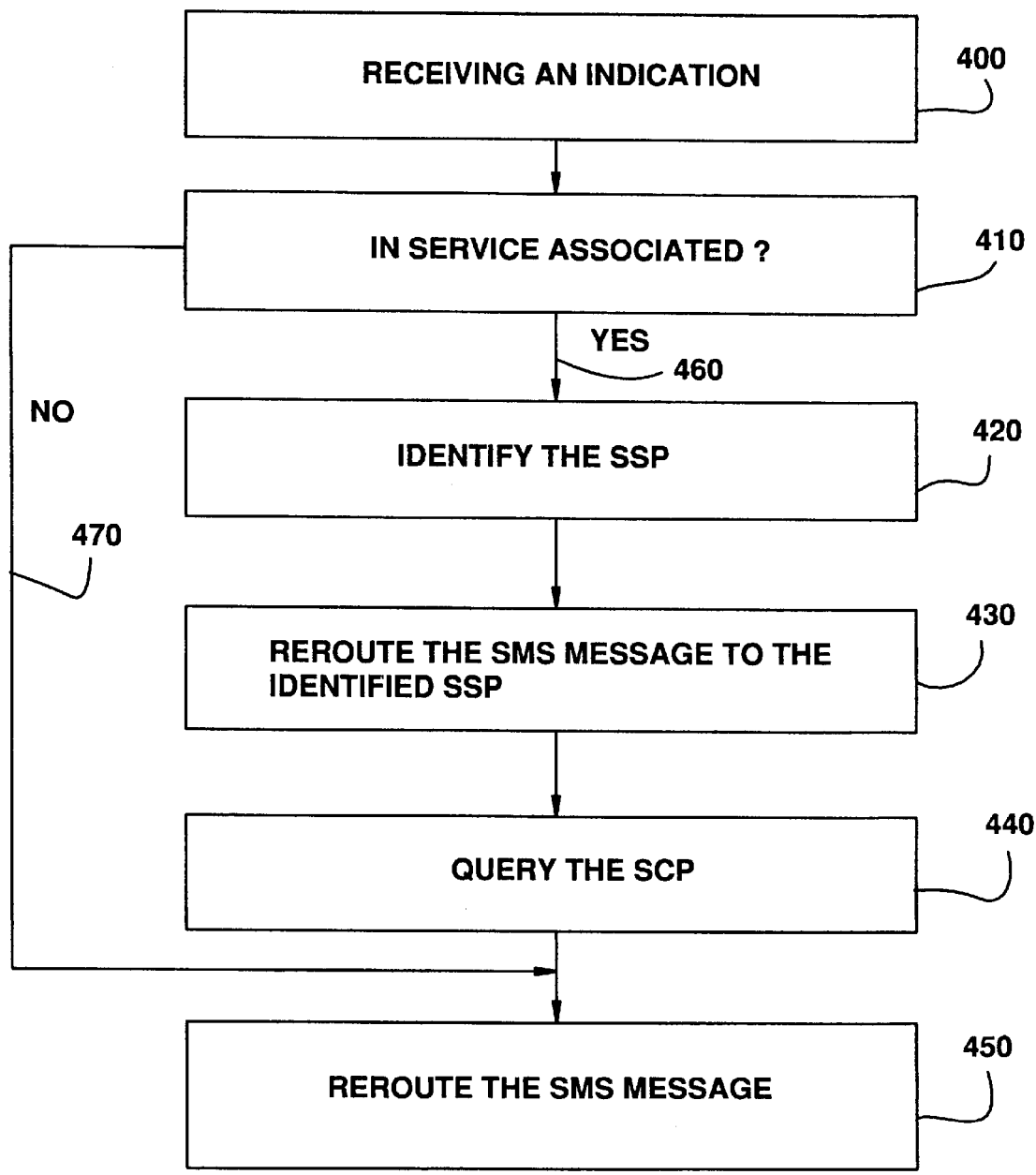
FIG. 5 is a flow chart describing the steps performed in routing an SMS Message using an associated IN service within a mobile telecommunications network.

Reference is now made to FIG. 5 illustrating the steps performed in order to communicate SMS data using existing IN services in accordance with the teachings of the present invention. A mobile station receives an indication from an associated mobile subscriber to originate an outgoing SMS message towards a particular B-number at step 400. Instead of transmitting the received SMS message directly toward an associated SMS-C, an application module associated with the mobile station determines whether the calling party subscriber or the dialed B-number is associated with an IN service at step 410. There is no need for the application module to determine exactly which IN service needs to be invoked for this particular SMS message. Such a determination will be made later by an SCP. The application module only needs to determine whether any IN service is associated with the called party or calling party. The application module can determine whether the dialed B-number is associated with an IN service by evaluating the syntax of the dialed B-number. If the dialed B-number is not a full E.164 formatted directory number, such a number may represent a short number associated with the PNP feature. The dialed number may also include a specific area code, such as "800" or "900" indicating that the dialed number is a toll-free or free phone. The dialed B-number may also be a service code associated with a particular IN service.

After making such a determination, if neither calling party subscriber nor the dialed B-number is associated with an IN service (NO decision link 470), the received SMS data are routed to the SMS-C associated with the dialed B-number in a conventional manner.

On the other hand, in response to an affirmative determination (YES decision link 460), the serving MSC/VLR identifies the appropriate IN telecommunications node. If the calling party subscriber is associated with an IN service, an IN telecommunications node, such as an SSP, associated with the calling party subscriber is identified. If the dialed B-number or called party subscriber is associated with an IN service, an IN telecommunications node associated with the called party subscriber is similarly identified at step 420. The received SMS data encapsulated within an ISUP signal is then rerouted to the identified SSP at step 430. The SSP, in turn, queries the associated SCP for routing instructions at step 440. The SCP then determines exactly which IN service needs to be invoked. By invoking the appropriate IN service, the SCP ascertains how to process the ISUP signal encapsulating the SMS data received by the SSP. Such ascertained instructions are then provided back to the SSP. Utilizing the received instructions, such as a full directory number associated with a dialed short number, the SSP then reroutes the message to the appropriate SMS-C associated with the called party directory number.

Although a preferred embodiment of the method and apparatus of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. A method for integrating components of an Intelligent Network and components of a Short Message Service (SMS) Network within a mobile telecommunications network, said method comprising the steps of:
   receiving at a first telecommunications node associated with said mobile telecommunications network an indication from a calling mobile subscriber to transmit SMS data towards a called mobile subscriber;
   determining whether said calling mobile subscriber or said called mobile subscriber subscribes to a service provided by the Intelligent Network; and
   in response to an affirmative determination,
      identifying a second telecommunications node associated with said Intelligent Network; and
      transmitting said SMS data from said first telecommunications node to said second telecommunications node;
   treating said transmitted SMS data in accordance with the service provided by the Intelligent Network where said calling mobile subscriber is able to communicate the SMS data while utilizing the service provided by the Intelligent Network;
   forwarding said treated SMS data from said second telecommunications network to a third telecommunications network associated with said SMS Network; and
   transmitting said forwarded SMS data from said third telecommunications node to said called mobile subscriber.

2. The method of claim 1 wherein said first telecommunications node comprises a mobile switching center (MSC).

3. The method of claim 1 wherein said second telecommunications node comprises a Service Switching Point (SSP).

4. The method of claim 1 wherein said third telecommunications node comprises a Short Message Service-Center (SMS-C).

5. The method of claim 1 wherein said step of determining whether said called mobile subscriber subscribes to a service provided by the Intelligent Network further includes evaluating a syntax of a dialed B-number.

6. The method of claim 1 wherein said step of transmitting said SMS data from said first telecommunications node to said second telecommunications nodes further includes transporting said SMS data using an Integrated Service Digital Network User Part (ISUP) signal.

7. The method of claim 1 wherein said service provided by the Intelligent Network further includes a selected one of a Private Number Plan (PNP), Originating Call Barring feature, Closed User Groups feature, Restriction Override feature and Call Diversion feature.

8. The method of claim 1 wherein said step of treating said transmitted SMS data further includes querying a Service Control Point (SCP) of the Intelligent Network.

9. The method of claim 1 wherein said transmitting said forwarded SMS data from said third telecommunications node to said called mobile subscriber further includes determining whether said called mobile subscriber is currently roaming.

10. A mobile telecommunications network for integrating components of an Intelligent Network with components of a Short Message Service (SMS) Network, said mobile telecommunications network comprising:
   a first telecommunications node associated with said mobile telecommunications network for receiving an indication from a calling mobile subscriber to transmit SMS data towards a called mobile subscriber, said first telecommunications node further includes:
      means for determining whether said calling mobile subscriber or said called mobile subscriber subscribes to a service provided by the Intelligent Network;
      means, responsive to an affirmative determination, for identifying a second telecommunications node associated with said Intelligent Network; and
      means for transmitting said SMS data from said first telecommunications node to said second telecommunications node;
   a third telecommunications node associated with said Intelligent Network for treating SMS data received from the second telecommunications node in accordance with the service provided by the Intelligent Network, where said calling mobile subscriber is able to communicate the SMS data while utilizing the service provided by the Intelligent Network; and
   a fourth telecommunications node associated with said SMS Network for transmitting the treated SMS data received from said third telecommunications node to said called mobile subscriber.

11. The mobile telecommunications network of claim 10 wherein said first telecommunications node comprises a mobile switching center (MSC).

12. The mobile telecommunications network of claim 10 wherein said second telecommunications node comprises a Service Switching Point (SSP).

13. The mobile telecommunications network of claim 10 wherein said third telecommunications node comprises a Service Control Point (SCP).

14. The mobile telecommunications network of claim 10 wherein said fourth telecommunications node comprises a Short Message Service-Center (SMS-C).

15. The mobile telecommunications network of claim 10 wherein said means for determining whether said called mobile subscriber subscribes to a service provided by the Intelligent Network further includes means for evaluating a syntax of a dialed B-number.

16. The mobile telecommunications network of claim 10 wherein said means for transmitting said SMS data from said first telecommunications node to said second telecommunications nodes further includes means for transporting said SMS data using an Integrated Service Digital Network User Part (ISUP) signal.

17. The mobile telecommunications network of claims 10 wherein said service provided by the Intelligent Network further includes a selected one of a Private Number Plan (PNP), Originating Call Barring feature, Closed User Groups feature, Restriction Override feature and Call Diversion feature.

* * * * *